United States Patent Office 3,098,943
Patented July 23, 1963

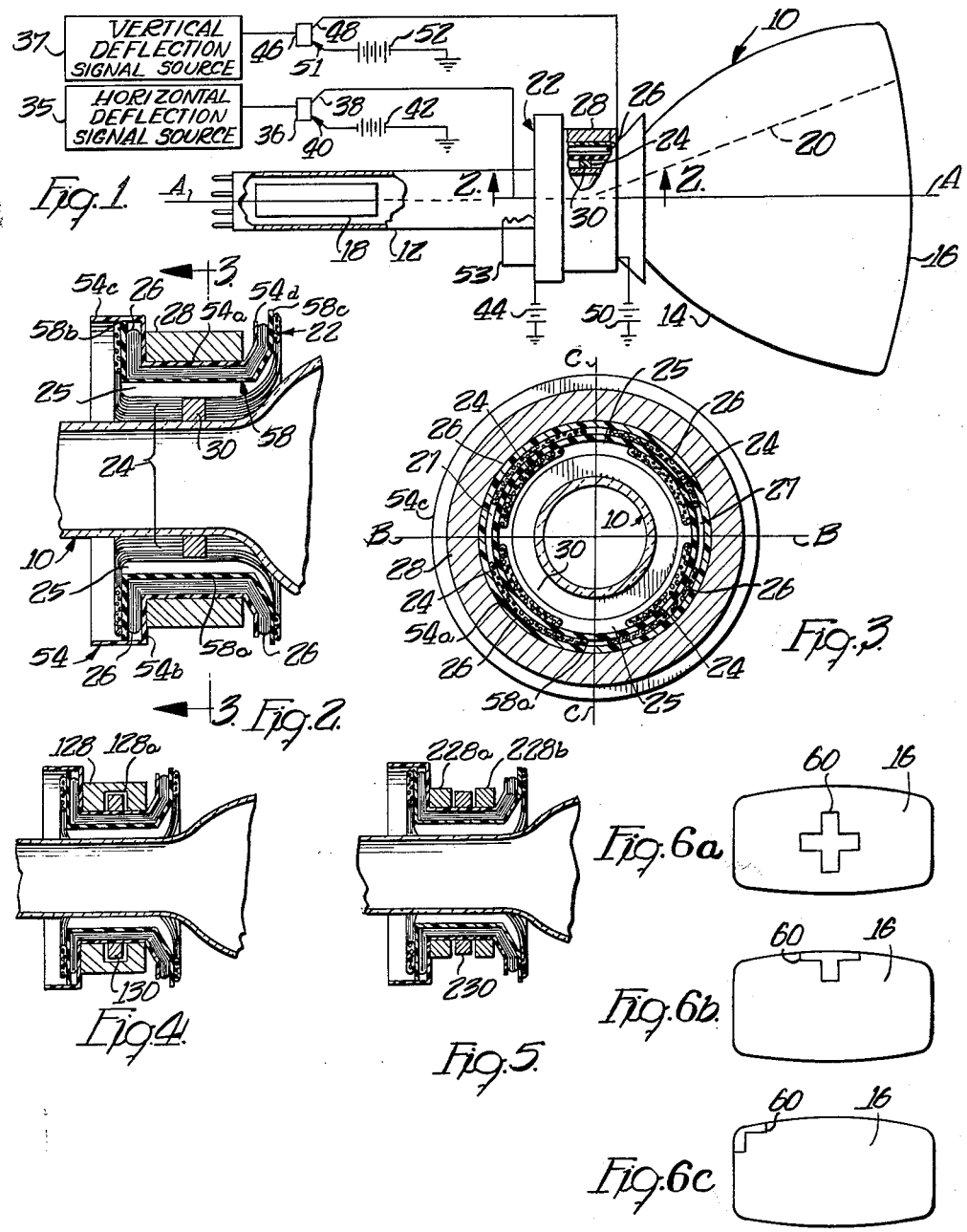

3,098,943
CATHODE RAY PERMANENT MAGNET
BEAM POSITIONER
Sol L. Reiches, Shaker Heights, Ohio, assignor, by mesne assignments, to Zenith Radio Corporation, Chicago, Ill., a corporation of Delaware
Filed Sept. 18, 1957, Ser. No. 684,738
8 Claims. (Cl. 313—77)

The present invention relates to a beam positioning mechanism for a television cathode ray tube. It is particularly suitable for installation as part of a sweep system where the energizing current includes a significant unidirectional component of current. This application is a continuation-in-part of applicant's copending application Serial No. 490,296, filed February 24, 1955, and assigned to the same assignee.

In a television cathode ray tube a beam of electrons is emitted from a gun located in the neck of the tube and directed toward a coated viewing screen at or near the face of the tube. The screen produces light and, when the beam is swept across the screen in scanning action, defines a television image raster. Generally, the beam is caused to scan the screen by time varying magnetic fields in the neck of the tube which deflect the beam in varying amounts. These magnetic fields are produced by a time-varying current which is passed through the horizontal and vertical coils of a deflection yoke straddling the neck of the tube.

In many television receiver circuits, such as one where the deflection yoke is directly coupled to a transistor deflection signal source circuit, the energizing currents passed to the coils of the yoke have a substantial unidirectional component. This component establishes a time-constant magnetic field in the neck of the tube which shifts the television image raster a substantial distance off-center on the viewing screen. To achieve a centered raster a substantial opposing magnetic field must be established to overcome the field produced by the unidirectional component of the energizing current.

In the illustrated embodiment of the present invention a magnetic deflection yoke is provided which is particularly suitable for installation in receivers where current with a substantial unidirectional component of current is utilized to energize the yoke coils, or at least one of them. In brief, a fixed magnetic ring of material having a low permeability is located within the yoke assembly to encircle the neck of the tube in centered relation to the coils of the yoke. Preferably, the ring is magnetized after installation in the yoke assembly to passing a current through the coil, or coils, which produce the magnetic field which is to be overcome. The currents, which are applied successively to the coils, induce permanent magnetic fields across the ring precisely coincident in direction to the fields produced by the unidirectional components of the energizing currents and opposed to those fields. The amount of current passed through the coils to magnetize the ring will determine the strength of the permanent magnetic field induced across the ring and should be proportional to the displacement caused by the energizing current in order to compensate for that displacement.

The field of the permanent magnet within the yoke assembly will not affect the sweep function of the yoke because the permanent magnet field is coincident with the field established by the yoke. This is important where a large compensation is required to center the television raster because even a slight deviation in orientation of the respective fields will cause distortion. It is for this reason that the structure of the present invention is preferable to those of the prior art embodying adjustable permanent magnetic fields. In addition, with the latter a small adjustment will cause a relatively large shift in the image and it is extremely difficult to set and maintain the magnets at proper adjustment for precise compensation of a large displacement.

The present invention pertains to a cathode-ray beam deflection apparatus mounted on a cathode-ray tube neck and comprising a deflection yoke responsive to energizing current to develop a field having a predetermined flux line pattern in a plane transverse to the neck. Associated with the foregoing is a ring shaped magnet aligned with the yoke and polarized to develop a field having a flux line pattern in the plane of the magnet which is substantially alike the predetermined pattern of the yoke field.

It is therefore a general object of the present invention to provide a beam positioning mechanism capable of compensating for large displacements of the beam landing position.

It is another object of the present invention to provide a beam positioning mechanism which will compensate for displacement caused by unidirectional components in the currents energizing the deflection yoke coils.

It is still another object of the present invention to provide a sweep assembly with a single fixed permanent magnet ring to compensate for displacement caused by unidirectional components of the current energizing either or both the horizontal deflection coil and the vertical deflection coil.

It is yet another object of the present invention to provide a sweep assembly having a compensating magnetic field precisely coincident in direction to the magnetic field produced by the coil of the sweep mechanism.

The novel features which I believe to be characteristic of my invention are set forth with particularity in the appended claims. My invention itself, however, both as to its organization and method of operation, together with further objects and advantages thereof, will be best understood by reference to the following description taken in conjunction with the accompanying drawings in which:

FIGURE 1 is a partly schematic diagram showing a portion of a television receiver circuit and a plan view of the receiver cathode ray tube;

FIGURE 2 is a view through section 2—2 of FIGURE 1;

FIGURE 3 is a view through section 3—3 of FIGURE 2;

FIGURE 4 is an elevational view of a sweep assembly embodying a modified form of the present invention;

FIGURE 5 is an elevational view of a sweep assembly embodying another modified form of the present invention; and FIGURES 6a, 6b, and 6c show the television image raster on the viewing screen when properly centered, when displaced by a unidirectional component in the energizing current for the vertical coil, and when displaced by unidirectional components in the energizing currents in both the vertical and the horizontal coil.

A sweep assembly including the present invention is shown, in FIGURE 1, in conjunction with a cathode ray tube 10 having a neck portion 12 and a flared conical portion 14. The tube 10 has a longitudinal axis A—A which also defines the longitudinal axis of the neck 12. The conical portion 14 has a coated face plate 16, opposite the neck 12 of the tube, which defines a television receiver viewing screen. A gun assembly 18, which may consist of a single cathode ray beam gun or a plurality of such guns, is located in the neck of the tube and oriented to direct at least one ray beam 20 towards the viewing screen 16. The sweep mechanism includes a yoke 22 which encircles the neck 12 of the tube and is positioned adjacent the flared conical portion of the tube 14. The yoke 22 has a pair of horizontal coils 24, each having a central opening 25, a pair of vertical coils 26, each having a central opening 27, a core 28 encircling the coils, and a permanent magnet 30. The horizontal deflection coils 24 receive a saw tooth sweep current from the horizontal deflection signal source 35 in the television receiver. This signal is amplified through the transistor 36, the collector 38 of which is connected to the horizontal coils 24. The emitter 40 is connected through the biasing potential 42 to ground. The other ends of the horizontal coils 24 are connected through the biasing potential source 44 to ground. Similarly, the vertical deflection sweep current signal, which is received from source 37, is amplified through the transistor 46 which has a collector 48 connected to the vertical deflection coils 26 and an emitter 51 which is connected through the biasing potential 52 to ground. The other ends of the vertical deflection coils 26 are connected to ground through the biasing potential source 50.

Encircling the neck 12 of the tube adjacent the sweep mechanism is a centering device 53, which may, for example, consist of two rotatable permanent magnets. The centering device 53 serves to provide minor adjustments for displacements caused by factors other than unidirectional components of the energizing currents.

The details of the yoke are best shown in FIGURES 2 and 3. The yoke 22 has an outer casing 54 consisting of a central cylindrical portions 54a, an annular rear face plate 54b extending outwardly therefrom, and a rim portion 54c extending rearwardly from the outer margin of the face 54b. The casing also has an outwardly extending forward annular face plate 54d. A core 28 of material having a high permeability, which may, for example, be 400, encircles the central cylindrical portion of the casing 54a between the rear face plate 54b and the forward face plate 54d. Within the outer casing 54 is a rubber sheath 58 which has a central cylindrical portion 58a, a radially extending annular rear face plate 58b, and an annular radially extending forward face plate 58c. The portions of the rubber sheath 58 are spaced from the outer casing 54 to define a space therebetween within which the vertical coils 26 are received. As shown best in FIGURE 3, each of the vertical coils 26 has a central opening 27 having a common axis B. As shown in FIGURES 2 and 3 the vertical coils 26 are symmetrically positioned in relation to the axis B and have portions extending outwardly between the respective face plates of the casing 54 and sheath 58.

The horizontal deflection coils 24 are secured to the inner surface of the rubber sheath 58. As shown best in FIGURE 2 the horizontal coils 24 extend the entire span of the central portion of the sheath 58 and are secured to the forward and rear face plates 58b and 58c of the sheath. Each of the horizontal coils 24 has a centered opening 25 with a common axis C. The vertical coils 26 and the horizontal coils 24 are oriented circumferentially 90 degrees from each other and the central axes B and C of the respective pairs of coils intersect to define a common plane of symmetry of the coils.

A fixed permanent magnet ring 30 encircles the neck 12 of the tube within the yoke 22 and is positioned substantially on the plane of symmetry of the coils. The ring 30 is made of material having a low permeability, preferably substantially equal to unity. The ring, having a permeability substantially equal to that of air, will not affect the distribution of the flux produced by the deffection coils. The ring 30 is made of a magnetic material having a high degree of retentivity and coercivity so that it may be permanently magnetized, preferably in the manner hereinafter described.

A modification of the present invention is shown in FIGURE 4. In this embodiment the core 128 encircles the horizontal and vertical coils as in the previous embodiment but the core has an inner peripheral groove 128a located on the plane of symmetry of the pairs of coils. The fixed permanent magnet ring 130 is positioned in the groove 128, and therefore, lies on the plane of symmetry of the coils and encircles these coils.

An additional modification of the present invention is shown in FIGURE 5. In this modification a pair of cores 228a and 228b encircles the horizontal and vertical coils in spaced relationship to each other and straddling the plane of symmetry of the coils. The fixed permanent magnet ring 230 is positioned between the cores 228a and 228b to lie on the plane of symmetry of the coils and encircle those coils.

The magnet rings 30, 130 and 230 are best magnetized when in their fixed position within the yoke. In the magnetizing process described herein the magnetizing current is supplied from an independent source which may be connected to the yoke coil leads when the yoke is installed in the receiver, after removing the leads from the deflection current source, or which may be connected to the yoke coil leads prior to installation of the yoke in the set. If the saw-tooth deflection current which energizes the horizontal coil has a substantial unidirectional component of current, a current opposite in direction to that of the unidirectional component is passed through the horizontal coils to magnetize the magnet ring. Similarly, if the vertical deflection current has a substantial unidirectional component of current, the ring is magnetized by passing a current through the vertical coil opposite in direction to the unidirectional component of the deflection current. A single ring may be magnetized by successive energization of the horizontal coils and the vertical coils. The magnitude of the currents used to magnetize the rings 30, 130, and 230 in this instance should preferably be sufficiently great to produce a permanent magnetic field equal in magnitude, but opposite in orientation, to the magnetic field due to the unidirectional component in the deflection current.

The operation of the present invention is best described by reference to FIGURES 6a, 6b, and 6c. FIGURE 6a illustrates the viewing screen of a television receiver with the television image raster 60 centered thereon. FIGURE 6b illustrates the position of the television image raster 60 when a large vertical displacement occurs such as occurs when a significant unidirectional component of current is present in the signal source applied to the vertical deflection coils. In the condition illustrated in FIGURE 6b no horizontal displacement occurs and compensation therefor need not be made. To compensate for the displacement shown in FIGURE 6b the magnet ring 30, or 130, or 230 is magnetized by passing a large current through the vertical deflection coil after the ring has been placed in its operating position on the plane of symmetry of the coils within the yoke. This large magnetizing current applied to the ring is opposite in direction to the unidirectional component of the deflection current applied to the vertical coils during operation of the receiver. After the magnetizing current has been passed through the vertical coils a magnetic field will be impressed across the ring. This field will precisely coincide with the field pattern established by the vertical coils during the normal operation of the set but will be opposite in direction to the field resulting from the unidirectional component of deflection current. Because of the precise coincidence of this compensating field the normal sweep function of the sweep mechanism will not be affected adversely nor will distortion be caused. On the other hand the field thus produced will only have the effect of offsetting the field causing the severe displacement shown in FIGURE 6b. When the set is operated the television image raster will be centered on the viewing screen, as shown in FIGURE 6a.

The condition illustrated in FIGURE 6c results from both horizontal and vertical displacement such as might be caused by unidirectional components of current in the deflection current supplied to both the vertical and the horizontal coils. To overcome this condition the rings 30, 130 or 230 are magnetized after they have been fixed in their proper position in relation to the yoke. To properly compensate for the conditions shown in FIGURE 6c the ring is magnetized by successively passing a current through the vertical coil and the horizontal coil. Since the permanent magnet rings 30, 130, or 230, are each of low permeability, having a permeability substantially equal to air, any of the rings can be successively magnetized by currents passed successively through the vertical and horizontal coils without any significant coupling of the horizontal and vertical fields. This will establish across the ring fields which will oppose the fields produced during operation of the set by the unidirectional components of the current passing through both the horizontal and the vertical coils. Upon operation of the receiver the television image raster 60 will be centered, as shown in FIGURE 6a.

Thus the device of the present invention provides a simple, effective beam positioner which compensates for large displacements caused by the deflection currents. With a single magnetic ring, which may be fixed in relation to the yoke, both horizontal and vertical displacements can be corrected. Moreover, a simple, effective process is provided by which a compensating field of precise field pattern and proper magnitude is established in a single magnet ring within a yoke.

It will be noted that when current flow is passed through the sweep coils for purposes of magnetizing the compensating magnet ring (30, 130 or 230), the field pattern is identical in shape with the field pattern of ordinary sweep current flow. For this reason, the structure herein described provides inherent conformity between the compensating permanent magnetic field of the ring 30, 130 or 230 and the sweep field. In other words these fields are inherently coextensive and of like shapes, so that it is unnecessary to make mechanical or electrical adjustments to provide compensation for the distortion, loss of color purity, or other undesired effects. It should further be noted that the necessary magnetizing current may be obtained by condenser discharge through the sweep coils—or other current pulse means—since the peak value of the magnetizing current and not its wave shape is the important consideration.

While I have shown and described specific embodiments of the present invention it will be understood that numerous modifications and alternative constructions may be made without departing from its true spirit and scope. I therefore intend by the appended claims to cover all such modifications and alternative constructions as fall within their true spirit and scope.

What I claim as new and desire to secure by Letters Patent of the United States is:

1. Cathode-ray-beam deflection apparatus mountable on a cathode ray tube neck and comprising: a deflection yoke responsive to energizing current to develop a field having a predetermined flux line pattern in a plane transverse to said neck; and a ring-shaped magnet aligned with said yoke and polarized to develop a field having a flux line pattern in the plane of the magnet substantially alike said predetermined pattern.

2. Cathode-ray-beam deflection apparatus mountable on a cathode ray tube neck and comprising: a deflection yoke having horizontal and vertical deflection coils and responsive to energizing current to develop a field having a predetermined flux line pattern in a plane transverse to said neck; and a ring-shaped magnet of substantially unity permeability material disposed within said coils and polarized to develop a field having a flux line pattern in the plane of the magnet substantially alike said predetermined pattern.

3. Cathode-ray-beam deflection apparatus mountable on a cathode ray tube neck and comprising: a deflection yoke having horizontal and vertical deflection coils and responsive to energizing current to develop a field having a predetermined flux line pattern in a plane transverse to said neck; a core of magnetic material encircling said coils and having an inner peripheral groove; and a ring-shaped magnet nested within said groove and polarized to develop a field having a flux line pattern in the plane of the magnet substantially alike said predetermined pattern.

4. Cathode-ray-beam deflection apparatus mountable on a cathode ray tube neck and comprising: a deflection yoke having horizontal and vertical deflection coils and responsive to energizing current to develop a field having a predetermined flux line pattern in a plane transverse to said neck; a pair of spaced cores of magnetic material encircling said coils; and a ring-shaped magnet encircling said coils between said cores and polarized to develop a field having a flux line pattern in the plane of the magnet substantially alike said predetermined pattern.

5. Cathode-ray-beam deflection apparatus mountable on a cathode ray tube neck and comprising: a deflection yoke having horizontal and vertical sweep coils defining a common plane of symmetry and responsive to energizing current to develop a field having a predetermined flux line pattern in a plane transverse to said neck; and a ring-shaped magnet lying substantially in said plane of symmetry and polarized to develop a field having a flux line pattern in the plane of the magnet substantially alike said predetermined pattern.

6. Cathode-ray-beam deflection apparatus mountable on a cathode ray tube neck and comprising: a deflection yoke having horizontal and vertical sweep coils defining a common plane of symmetry and responsive to energizing current to develop a field having a predetermined flux line pattern in a plane transverse to said neck; and a ring-shaped magnet of substantially unity permeability material disposed inside said coils and lying substantially in said plane of symmetry and polarized to develop a field having a flux line pattern in the plane of the magnet substantially alike said predetermined pattern.

7. Cathode-ray-beam deflection apparatus mountable on a cathode ray tube and comprising: a deflection yoke responsive to energizing current to develop a field including a unidirectional component having a predetermined flux line pattern in a plane transverse to said neck with predetermined strength and direction; and a ring-shaped magnet coacting with said yoke and polarized to develop a field having a flux line pattern in the plane of the magnet substantially alike said predetermined pattern and of substantially said predetermined strength but opposite in direction.

8. Cathode-ray-beam deflection apparatus mountable on a cathode ray tube neck and comprising: a deflection yoke having horizontal and vertical sweep coils energizable to develop respective fields each including a unidirectional component having a predetermined flux line pattern in a plane transverse to said neck and with predetermined strength and direction; and a ring-shaped magnet coacting with said yoke and polarized to develop a resultant field composed of a pair of components respectively having flux line patterns in the plane of the magnet like said predetermined patterns and of substantially said predetermined strengths but opposite in directions.

References Cited in the file of this patent

UNITED STATES PATENTS

| | | |
|---|---|---|
| 2,195,470 | Roosenstein et al. | Apr. 2, 1940 |
| 2,553,039 | Gray | May 15, 1951 |
| 2,725,496 | Bull | Nov. 29, 1955 |
| 2,730,642 | Grosjean | Jan. 10, 1956 |
| 2,795,717 | Finkelstein et al. | June 11, 1957 |
| 2,817,782 | Over et al. | Dec. 24, 1957 |